United States Patent

[11] 3,604,535

| [72] | Inventor | Jack L. Whitaker |
| | | Horseheads, N.Y. |
| [21] | Appl. No. | 818,543 |
| [22] | Filed | Apr. 23, 1969 |
| [45] | Patented | Sept. 14, 1971 |
| [73] | Assignee | Hardinge Brothers, Inc. |
| | | Elmira, N.Y. |

[54] AUTOMATIC OILING SYSTEM
11 Claims, 8 Drawing Figs.

[52] U.S. Cl. .................................................. 184/7 R,
91/46, 92/154, 184/56 R
[51] Int. Cl. ........................................... F16n 7/30
[50] Field of Search ........................................... 184/3, 7, 7
CR, 7 C, 55 A, 81, 56; 222/193, 194; 55/337;
91/46; 92/154

[56] References Cited
UNITED STATES PATENTS

| 1,736,357 | 11/1929 | Norgren | 184/55 X |
| 1,278,657 | 9/1918 | Hoofer | 184/7 |
| 1,790,639 | 2/1931 | Amon | 184/7 |
| 2,112,860 | 4/1938 | Moore | 184/7 |
| 2,616,523 | 11/1952 | Davis | 184/7 X |
| 2,935,159 | 5/1960 | Burrell | 184/3 |
| 3,051,263 | 8/1962 | McKenzie | 184/7 |
| 3,402,529 | 9/1968 | Frantz | 55/337 X |

Primary Examiner—Manuel A. Antonakas
Attorney—Shlesinger, Arkwright & Garvey

ABSTRACT: An oiling system in which oil is supplied to various parts of a machine by air pressure acting on the top of the oil reservoir while oil is fed from the lower part of the oil reservoir through ducts each having metering units to control the oil fed to various parts of the machine, some of the oil ducts being arranged within the air lines.

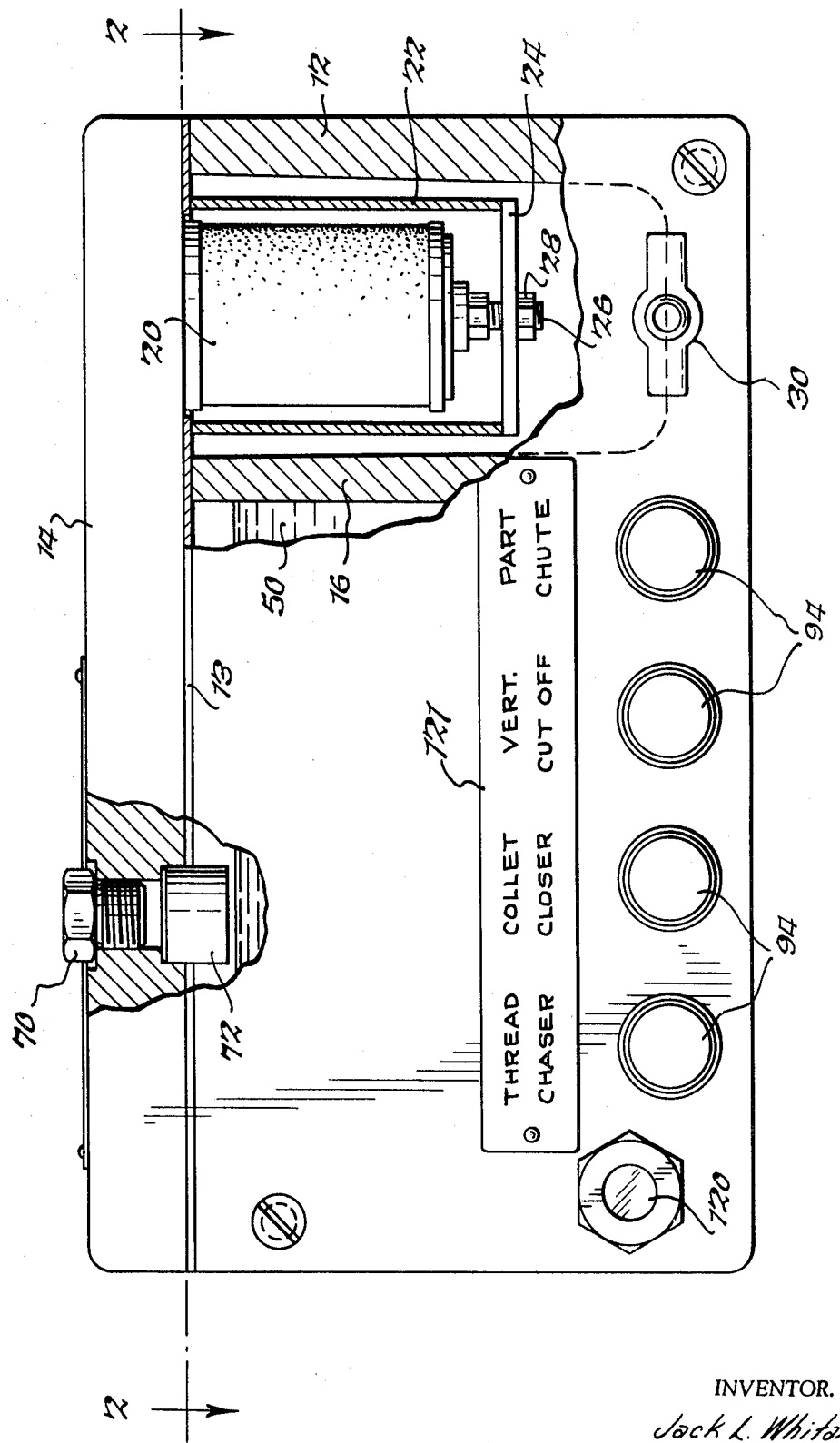

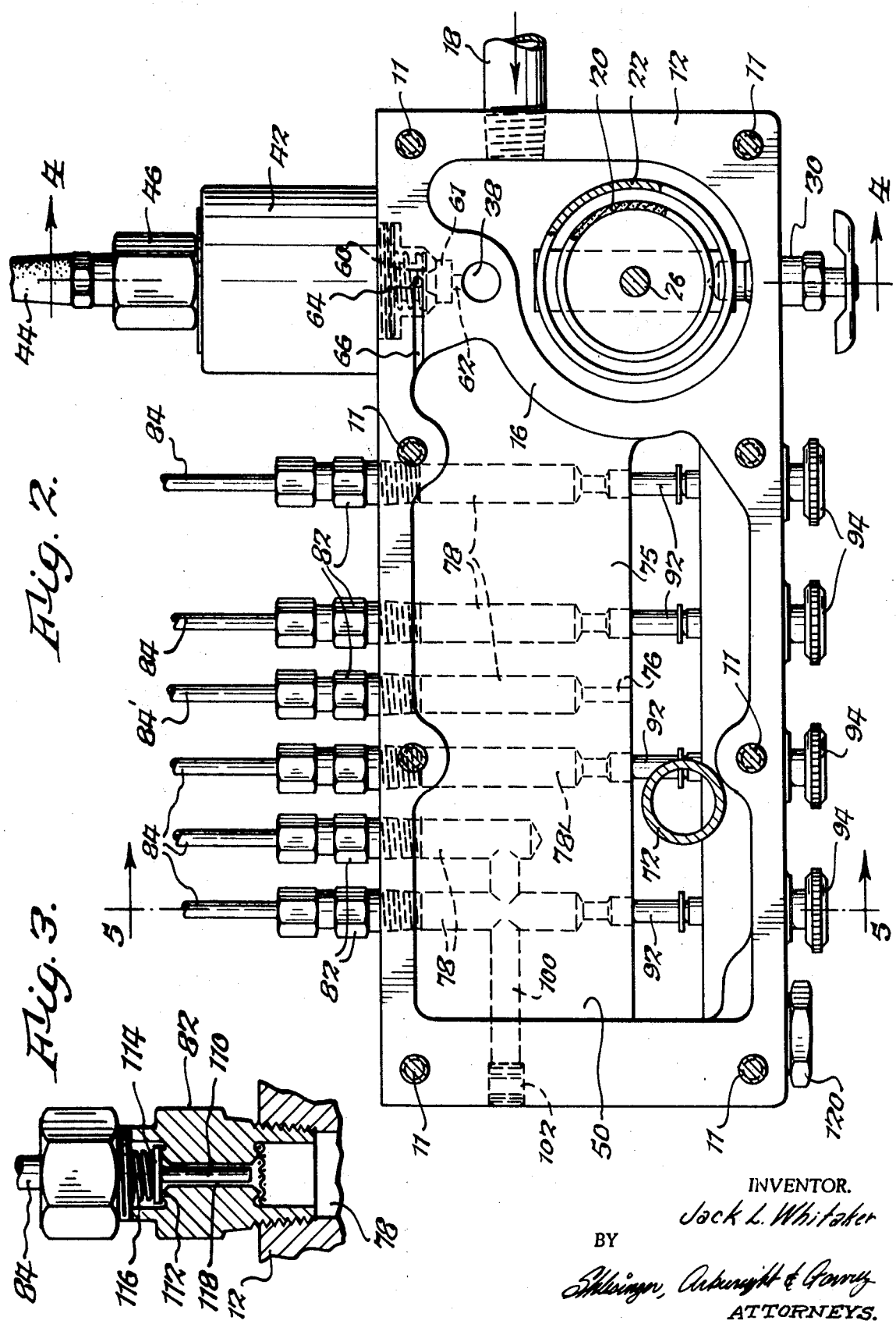

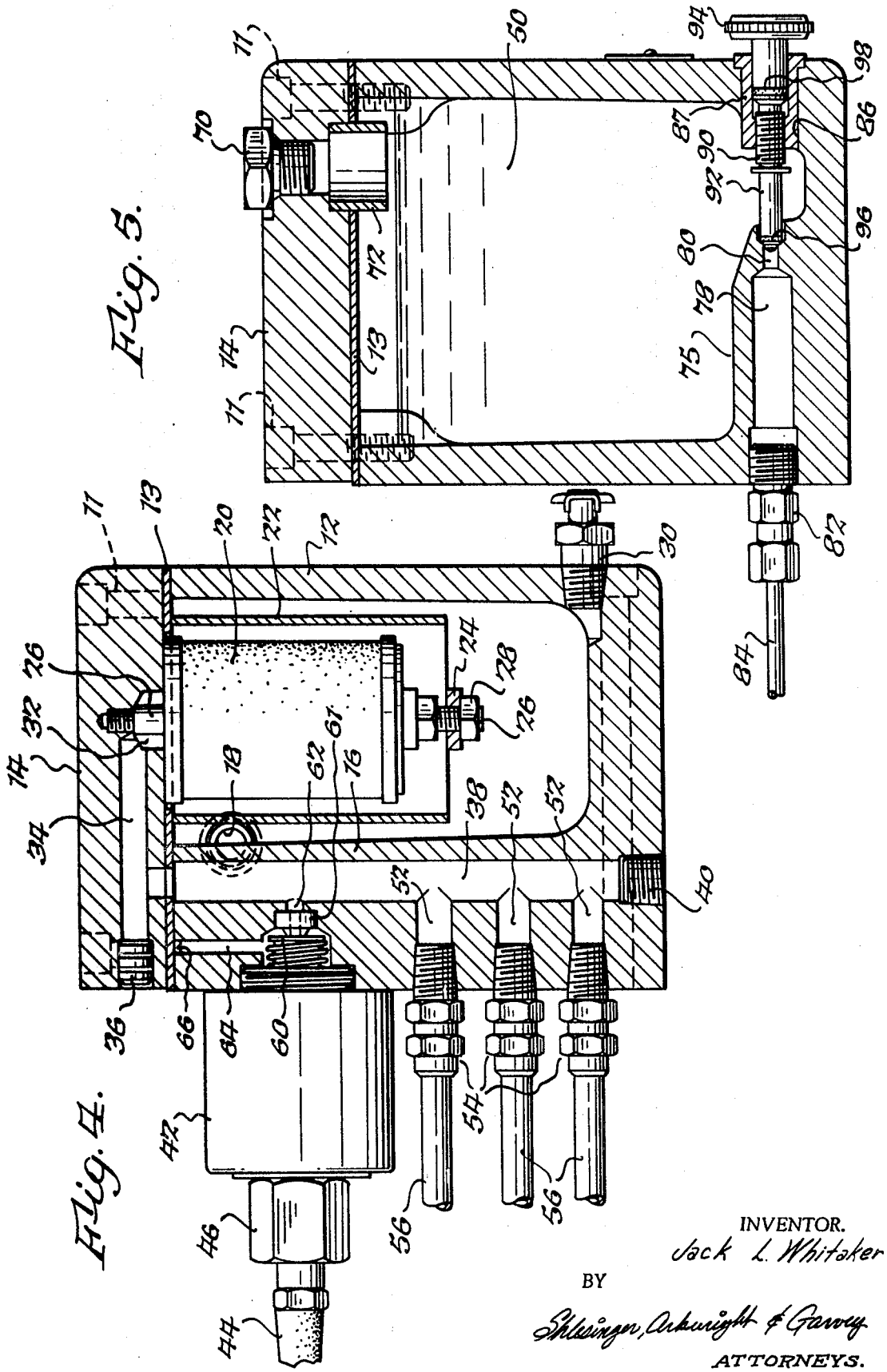

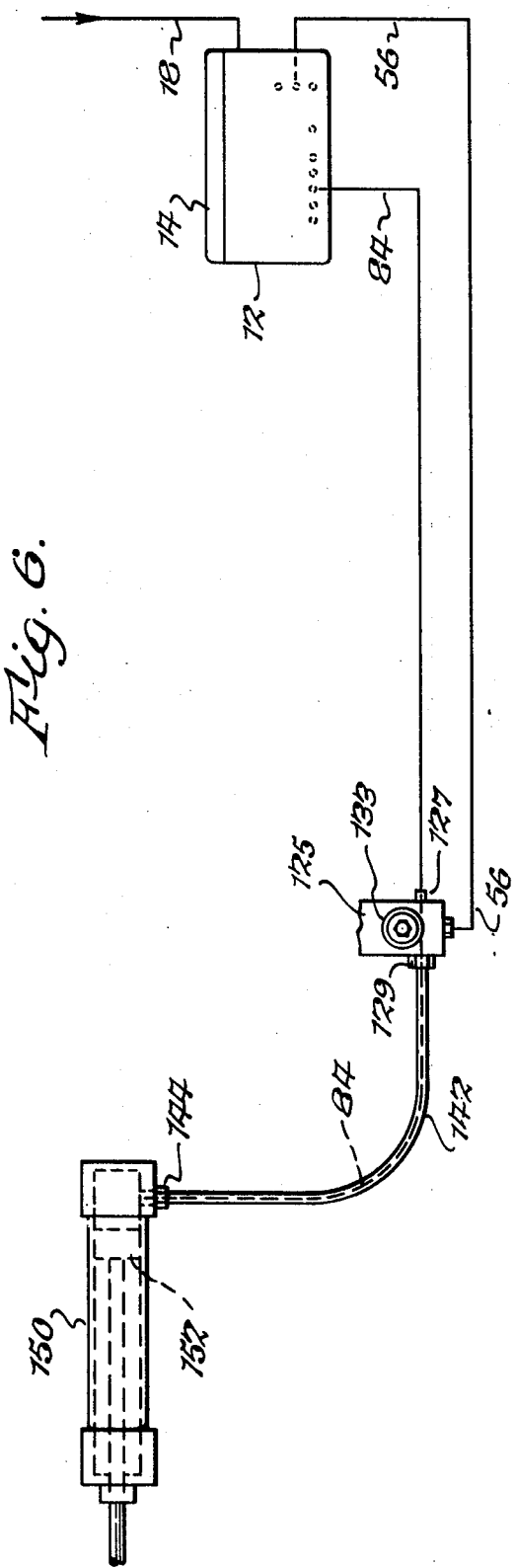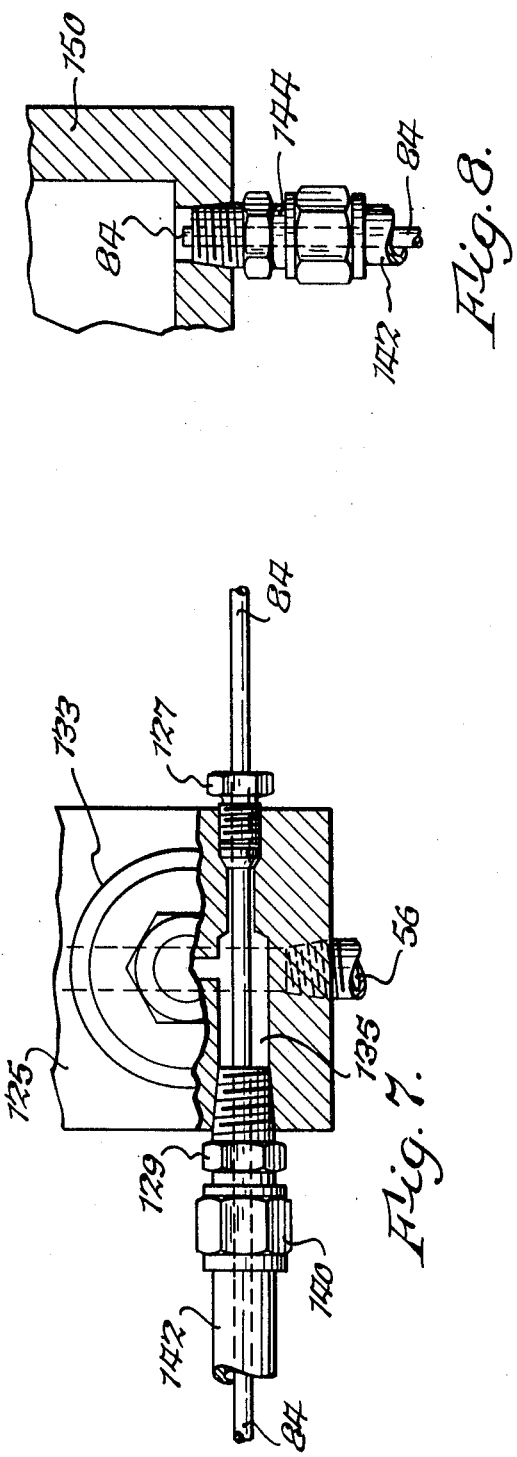

AUTOMATIC OILING SYSTEM

This invention relates to an oiling system for machines having a plurality of parts requiring lubrication. More particularly, this invention relates to an oiling system for machine tools which utilize both pneumatic pressure and lubrication lines in the apparatus.

Machine tools commonly use a great number of moving parts such as bearings, pistons, ways, and slides to perform the various functions of the machine. Many times, various parts are operated by pneumatic pressure for advancing slides, work holders and the like. Accordingly, the machine would normally include a source of compressed air and some system for lubrication of the various moving parts.

Frequently, the source of compressed air utilized to operate these parts is contaminated by dust and metal particles which can seriously affect the operation of the machine, possibly to the extent of destroying some parts.

Furthermore, the lubrication of the moving parts of the machine must be positive and accurately controlled in order to prevent undue wear on the moving parts.

Accordingly, it is a primary object of this invention to overcome the disadvantages of prior art oiling systems.

Another object of this invention is to provide an oiling system whereby the lubricant is delivered to the parts under pressure.

Still another object of this invention is to provide an oiling system wherein air is utilized to pressurize the lubricant.

Yet a further object of this invention is to provide an oiling system which utilizes filtered air both to pressurize the lubricant and to operate some of the parts of the machine.

Still a further object of this invention is to provide an oiling system which would be accurately controlled with respect to the amount of oil supplied to the parts as well as the time at which the parts are oiled.

A still further object of this invention is to provide an oiling system wherein the machine tool is less cluttered with various fluid lines.

Yet another object of this invention is to provide an oiling system wherein the oil line is positioned within and concentric with the air line.

In the accompanying drawings:

FIG. 1 is a side elevation partly in section of the housing or container for the apparatus or system.

FIG. 2 is a sectional plan view thereof on line 2—2, FIG. 1.

FIG. 3 is a fragmentary sectional view on an enlarged scale of an oil metering unit.

FIGS. 4 and 5 are sectional elevations of the apparatus taken on lines 4—4 and 5—5, FIG. 2.

FIG. 6 is a schematic view of a part of the oiling system.

FIG. 7 is a fragmentary sectional view of a manifold block controlling the connection of an oil and airhose to supply both air and oil to a power cylinder shown in FIG. 6.

FIG. 8 is an enlarged fragmentary view of the terminating end of the oil and airhoses at the power cylinder.

This improved automatic oiling system or apparatus includes a container having an outer shell or housing 12 in which various parts of the apparatus are arranged and this housing is closed by means of a lid 14 fitted tightly to the upper end of the housing 12 by means of a gasket 13 and cap screw 11.

It is generally desired that the air used in various parts of the machine be cleaned and as free as possible from moisture and other impurities, and there is provided at one end of the housing suitable means for cleaning the air entering into the same. This part of the housing is separated from the rest of the housing by means of an interior wall 16, thus forming an air chamber into which air is admitted under pressure through the inlet passage 18 and an oil chamber which receives air from the air chamber. This air chamber contains an air-cleaning device or filter 20 which may be of any usual or suitable construction, that shown being of cylindrical form and may be made of a porous metal, but any other air cleaning material may be employed if desired. The air filter shown is of cylindrical form and is contained in a tubular shroud member 22 also of cylindrical form and having at its lower end a transversely extending strap 24. The shroud and air filter are secured together by means of a threaded stud 26 secured at its upper end to the lid 14 and passing through the air filter and a hole in the strap 24 and held in place by a nut 28. The upper edge of the air filter has an airtight connection with the lower face of the lid 14. The air entering through the inlet 18 passes around the shroud 22 and through the open lower end thereof upwardly to the exterior of the air filter. Moisture is deposited on the shroud and drips to the bottom of the air chamber from which it may be removed through a drain valve 30. Other means for removing moisture from the air may be employed.

The filtered air passes upwardly from the interior of the air filter into a passage 32 in the lower face of the lid 14 into a laterally extending passage 34 formed by a drilled hole, the outer end of which is closed by a plug 36. The horizontal passage 34 is connected with a downwardly extending passage or duct 38 which may also be made by a drilled hole, the lower end of which is closed by means of a plug 40. This passage is connected with a lateral passage leading to a solenoid air valve 42 which has a muffler 44 connected by a fitting 46 to bleed off air when pressure is not wanted in the oil chamber.

The part of the housing or container beyond the interior wall 16 constitutes the oil chamber 50 and air pressure is conducted from the air chamber intermittently to the oil chamber by means of passages controlled by the solenoid valve, and also some parts of the machine which require a continuous supply of air may receive the same through drilled passages 52, three of which are shown in the construction illustrated. Some of these passages may be plugged if not needed, or they may have fittings 54 secured into them which connect with hoses 56 leading to parts of the machine which need a continuous filtered air supply.

The supply of air to the oil chamber above the oil level therein is controlled by the solenoid valve 42 which includes a movable valve member 60 which is arranged in the dividing wall 16 of the housing. The air passage 38 is provided with an outlet opening 62 which leads to a seat 61 for the movable part of the valve 60. When this valve is opened by removal of the valve member from its seat, air may flow through a passage 64 to a groove 66 in the upper wall of the housing leading to the top of the oil chamber. Consequently when the solenoid valve is in open position the air passes through the small hole 62 past the valve seat 61 into the passages 64 and 66 to the top of the oil chamber. When the valve 60 is moved into closed position, the supply of air to the upper part of the oil chamber is interrupted and the air from the top of the oil chamber is bled off and passed through the muffler 44 to the atmosphere. This allows pressure to be placed on the oil or removed from it depending upon the position of the solenoid valve 42.

The solenoid valve is opened and closed by means of a clock timer of any suitable construction and such timers are of well-known construction and therefore are not herein illustrated.

The oil chamber has a filler plug 70, FIG. 1, which may be secured in a hole in the lid or top of the apparatus and through which the tank may be supplied with oil. A level tube 72 is pressed into the bottom of the filler hole, and the level of the oil should not be above the bottom of this level tube since otherwise the oil would flow back into the solenoid valve thru the groove 66.

In connection with distributing the oil from the oil chamber 50 to various parts of the machine the lower part of the oil chamber is made of increased thickness as indicated at 75 in FIG. 5, and a plurality of oil passages 78, may be drilled into this part of the oil chamber and terminate at smaller holes 80 which may be readily controlled by means of valves, and the discharge ends of the oil passages 78 are provided with suitable coupling devices 82 to which hoses or tubes 84 for oil may be attached. Since the oiling apparatus herein disclosed may be used with various types of machines, some of which may require only one or two of the hoses 84, it is desirable to provide shutoff valve for controlling the entrance of oil through the holes 80. For this purpose the wall of the oiling device may be provided with suitable holes 86 for bushings 87. These bushings have threaded portions to receive threaded parts 90 of the valve stems by means of which the valve stems 92 may be moved toward and from the seats formed at the receiving ends of the oil inlet openings 80. Each valve member may be moved toward and from its seat formed at the receiving end of the opening 80 by means of a hand wheel 94 connected with the threaded part 90 of the valve stem, and in order to make a tight fit an O-ring 96 may be arranged in the oil inlet passage 80 and another O-ring 98 may be provided between the stem and the bushing 87 to prevent leakage of oil out of the oil chamber along the valve stem.

At the left side of FIG. 2 it will be noted that a hole 100 may be drilled from an end wall of the oil chamber across two of the oil passages 78 so that two of the oil pipes 84 may be controlled by a single valve. The outer end of the drilled hole 100 is closed by a plug 102. This may be desirable in the case of machines having two parts requiring oil, such for example, as parts of a thread chasing attachment. Since the oil pressure in the chamber 50 is under control of the solenoid valve 42 it will be obvious that the oil will flow only to the discharge pipes 84 when air pressure is applied to the top of the oil chamber by this valve.

Each line 84 carrying oil from the reservoir is preferably also provided with a metering unit which provides an optimum amount of oil to the line controlled thereby to suit the individual requirements of the parts to be lubricated. These metering units may conveniently be incorporated in the coupling devices 82 and are shown by way of example in FIGS. 2, 3 and 5. These metering units are combined orifices and check valves and each comprises a stemmed valve 110 having a head 114 which is biased toward a seat 112 by a spring 116. At the same time they serve to connect the oil pipes 84 to the oil chamber 50. Each of the various fittings 82 might have different size orifices 118 and valve stems 110, thus to meter oil of the proper quantity to its line 84 and then acting as a check valve prevent its return to the oil chamber 50.

Four shutoff valves 96 are provided to shut off the openings to certain attachments which may not be used on a particular machine. If a machine is purchased without these attachments, provision is made to put them on at a later date and the opening where the lubricating hose would be attached could be blocked off with this valve until such time as needed. Another function of these valves is that if the attachment is on the machine and not being used for a particular machining cycle, the lubrication may be shut off to the attachment and reopened when the attachment is again used.

The oil outlet 84' to the carriage has no shutoff valve but instead a direct passage 76 to the oil chamber 50, as the carriage is always used in any cycle and lubrication always required. All the valves control one outlet except that one for the thread-chasing attachment which controls two outlets. This is due to the requirement on this attachment for two outlets or supplies each requiring a different amount of oil. Since the oil in the chamber 50 is under control of the solenoid valve 42, it will be obvious that the oil will flow only to the discharge pipes 84 when air pressure is applied to the top of the oil chamber.

120 represents a low level sight gage to keep the operator from allowing the oil chamber 50 to run dry. For the convenience of the operator the different valves may be identified by a plate 121, FIG. 1, bearing the name of the parts to which oil ducts controlled by the valve handwheels 94 lead.

The output oil lines in many cases run direct to the device being oiled, but at several points on this machine a novel method of running the lubrication duct inside the air line is used. This is helpful in that the oil lines are hidden inside the air lines, and when moving devices are being oiled the number of separate hoses is reduced considerably, and if a lubricating duct were to break, the oil is then discharged into the air line. This is accomplished by putting the oil duct into a junction point with the air line and entering the air line through a squeeze type fitting which makes an airtight connection around the outside of the oil line.

FIG. 7 illustrates a junction of the air tube and the oil duct in a block or manifold 125 in which an oil duct 84 extends into and completely across the block with a suitable sealing fitting 127 at one side which seals against the escape of air from the block and another fitting 129 preventing the escape of air from the interior of the block. 56 is a duct bringing in a filtered air supply to this block from the lubricating housing 12.

The block 125, shown as an example, might be a valve block or a manifold used on automatic machines where various air lines are provided with air at the proper time to actuate power devices, such as carriage feed cylinders, cross fee, etc.

Filtered air from the line 56 is controlled by a solenoid valve 133 to provide air to the passage 135 which has an air tube or hose 142 connected to it by the fitting 129 and coupling 140. As noted the oil line 84 extends through the fitting 129 and into the air tube 142, and both, as seen in FIG. 6, terminate at one end of a power cylinder 150 having a piston 152.

FIG. 8 is an enlarged view, partly in section of the termination of the oil tube 84 and the air line 142 at the cylinder 150. Air line 142 is connected to a fitting 144 of the cylinder 150 which permits free flow of air to the cylinder 150 whenever permitted by the valve 133. The oil tube 84 terminates at the back end of the interior of the cylinder. Thus when valve 133 opens to provide air pressure to the cylinder 150, the piston 152 of this cylinder will be actuated. Also when the oil passes from the oil chamber 50 when controlled by the valve 42 it provides oil to the cylinder 150. The oil is projected into the cylinder at the point at which it will do the most good.

This construction provides only one exposed tube or hose to which the hazards of machines and abrasion are exposed on machines of this type rather than two exposed conduits. Also if the oil line 84 should fracture, the oil will still be contained in the outside airhose 142 to be delivered to the cylinder 150.

In the foregoing description it is assumed that all parts to be lubricated are at or above the oil level in the oil chamber so that the oil lines 84 will remain filled with oil when no air pressure is applied to the oil chamber. If oil were delivered by the oil lines 84 below the level of oil in the oil chamber, the check valve 112 would prevent oil from draining out of the oil chamber. A similar check valve could be applied at the outlet of any of the oil lines 84 to prevent oil from any of these lines from draining out, but with small diameter oil lines as commonly used on such systems the oil tends to stay in such lines without a check valve.

It will be understood that various changes in the details, materials and arrangements of parts which have been herein described and illustrated in order to explain the nature of the invention may be made by those skilled in the art within the principle and scope of the invention as expressed in the appended claims.

I claim:

1. An oiling system including a housing having an air chamber and an air pressurized oil chamber,
    an oil duct conducting oil from said oil chamber to a part requiring lubrication,
    a hollow block through which said oil duct extends,
    an air duct for conducting air from said air chamber to said block,
    said block having a sealing device at one end to prevent air from escaping about said oil duct and another sealing device forming a passageway through which said oil duct extends and through which air may pass from said block,
    and means on the other sealing device for attaching an airhose thereto about said oil duct.

2. An oiling system according to claim 1 and including a valve controlling the admission of air to said block.

3. An oiling system according to claim 1 and including a valve intermittently admitting air and discharging air from said block.

4. An oiling system according to claim 3
    means for controlling the intermittent pressure of air on said oil chamber, a fitting at the discharge end of said airhose and oil duct which discharges air and oil simultaneously from said airhose and oil duct as controlled by said valve on said block and said control means.

5. An oiling system including:
a. a container divided into an air chamber and an oil chamber,
b. a lid for said container having an airtight connection therewith,
c. a first passage in said lid to receive air from said air chamber,
d. a second passage in said container which receives air from said first passage,
e. a cylindrical air cleaning member in said air chamber secured to said lid in position to discharge cleaned air to said first passage,
f. another cylindrical member surrounding said air cleaning member in contact with which air passes on its way to said air cleaning member and which removes moisture from the air,
g. additional passages connecting with said second passage for transmitting air to parts where it is to be used,
h. another passage connecting with said second passage for transmitting air to the upper part of said oil chamber,
i. means for supplying air pressure to said air chamber,
j. a valve for controlling the supply of air from said air chamber to said oil chamber for subjecting the oil to pressure, and
k. means for conducting oil under pressure from said oil chamber to parts requiring lubrication.

6. An oiling system according to claim 5 and including:
a. means associated with said valve for shutting off the supply of air to said air chamber and discharging the air from said oil chamber.

7. An oiling system as in claim 5 and wherein:
a. said conducting means includes a plurality of passages receiving oil from said oil chamber,
b. a shutoff valve for each of said passages, and
c. said passages receiving oil for distribution to parts requiring oil.

8. An oiling system according to claim 5 in which said valve includes means for discharging air from said oil chamber at intervals.

9. An oiling system according to claim 5 and including metering units in each of said oil passages for limiting the quantity of oil to pass through said oil passage.

10. An oiling system according to claim 5 and including a check valve in each of said passages to prevent return flow of oil of said oil chamber when air under pressure on said oil chamber is interrupted.

11. An oiling system including:
a. a container having an oil chamber,
b. means for intermittently supplying air under pressure to said oil chamber to discharge oil therefrom,
c. a plurality of tubular oil ducts receiving oil from said oil chamber and extending through a manifold block to parts requiring oil,
d. an air line extending from said air supplying means to said manifold block.